Dec. 17, 1929.　　　S. VAHOUNY　　　1,740,211
CARRYING DEVICE
Filed Jan. 14, 1929
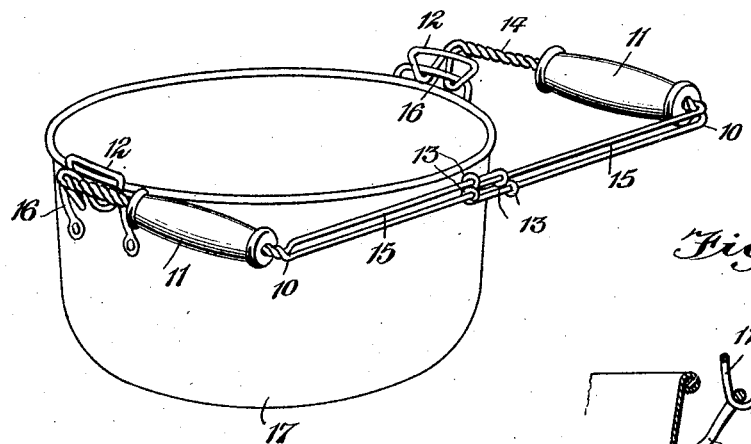
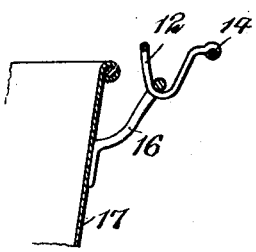
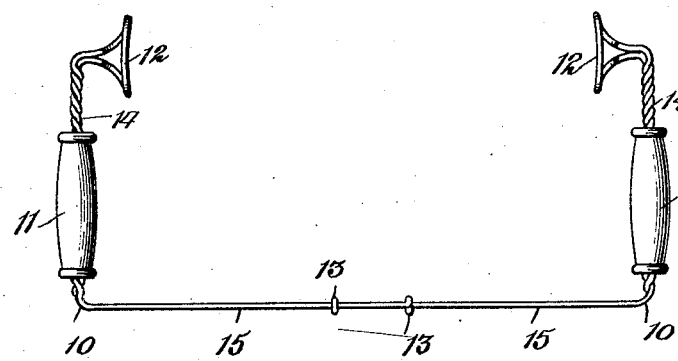
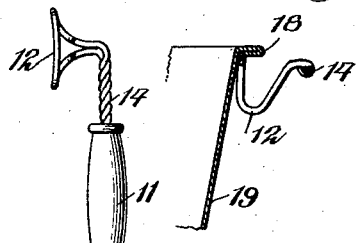
WITNESSES
INVENTOR
Sarkis Vahouny
BY
ATTORNEYS Patented Dec. 17, 1929

1,740,211

UNITED STATES PATENT OFFICE

SARKIS VAHOUNY, OF NEW YORK, N. Y.

CARRYING DEVICE

Application filed January 14, 1929. Serial No. 332,542.

This invention relates to a device which may be used advantageously for safely handling heated cooking vessels, such as pots and pans with their contents.

The principal object of the invention is the provision of a device of simple and improved construction with which a person may lift a heated vessel, pot or pan with its contents from a stove, or for removing one from an oven, and for conveniently carrying it to any desired point, and there releasing it, without being burned by steam from the heated contents, or from otherwise being burned.

Another object of the invention is the provision of a device of the indicated character which may be used for lifting or carrying a pot or pan equipped with the usual hand grips, or one not so equipped, but having the usual external flange, bead or rim.

The nature of the invention and its distinguishing features and advantages will appear when the following specification is read in connection with the accompanying drawing, in which—

Figure 1 is an elevation of a device constructed in accordance with the invention, and showing the manner of using the same.

Fig. 2 is a plan view of the device.

Fig. 3 is a detail sectional view showing one of the hooks of the device engaged with one of the hand grips of a cooking vessel.

Fig. 4 is a detail sectional view showing one of the hooks of the device engaged beneath the flange of a cooking vessel.

Referring now more particularly to the drawing, it will be apparent that, the device comprises two similar parts 10 each having a handle or hand grip 11. The said parts 10 are associated or are connected with each other for adjustment in order to serve in conjunction with vessels of various diameters or sizes. Each part 10 is preferably made from a single piece of stout wire which is bent and formed to provide an article engaging member, such as a hook or jaw 12, and members which are twisted together for a portion of their lengths, and each being provided with a terminal eye 13. The members are bent to provide relatively angularly disposed sections 14 and 15, said sections being disposed substantially at a right angle with respect to each other. The hook or jaw 12 is formed on the free end of the section 14 and extends laterally therefrom. The section 14 has arranged thereon the handle 11 which will be of heat resisting material. The eyes 13 of the members of the section 14 of each one of the parts 10 are respectively arranged in sliding engagement with the members of the section 14 of the other part. It will therefore be apparent that the parts 10 are adjustable on each other in order to be useful for lifting or carrying vessels of various sizes or diameters.

When it is desired to lift or carry a cooking vessel, pot or pan which is equipped with the usual hand grips, such as those designated 16 on the vessel 17, the hooks 12 need to be engaged therewith as clearly indicated in Fig. 3. When the hooks 12 are thus engaged, the device will be disposed laterally with respect to the vessel. The handles or grips 11 may then be firmly grasped with the hands for the purpose of lifting the vessel and its contents while heated and for safely carrying the same to any desired point, whereupon the device may be readily detached or be released. It is also obvious that when it is desired to lift and carry a pot or pan which is not equipped with the usual hand grips, but which has an external flange or rim such as the one designated 18 on the vessel 19 in Fig. 4, a portion of each hook may be engaged beneath the flange or rim in the manner shown, thus enabling a person to conveniently lift and carry the vessel in a safe manner without liability of being burned by rising steam from the contents of the vessel.

I claim:

A device of the class described comprising two parts, each part being formed of a single piece of stout wire to provide a twisted hand grip section, an article engaging member projecting laterally from one end of said section, spaced members integral with and disposed at right angles to said hand grip section, each of said members having a terminal eye, the terminal eyes of each one of said parts being slidably engaged with the spaced members of the other part to thus adjustably connect said parts together.

Signed at New York in the county of New York and State of New York this 12th day of January, A. D. nineteen hundred twenty nine.

SARKIS VAHOUNY.